United States Patent
Isobe et al.

(10) Patent No.: US 8,449,194 B2
(45) Date of Patent: May 28, 2013

(54) WHEEL BEARING WITH SENSOR

(75) Inventors: Hiroshi Isobe, Iwata (JP); Toru Takahashi, Iwata (JP)

(73) Assignee: NTN Corporation, Osaka (JP)

( * ) Notice: Subject to any disclaimer, the term of this patent is extended or adjusted under 35 U.S.C. 154(b) by 355 days.

(21) Appl. No.: 12/733,677

(22) PCT Filed: Sep. 16, 2008

(86) PCT No.: PCT/JP2008/002538
§ 371 (c)(1),
(2), (4) Date: Mar. 15, 2010

(87) PCT Pub. No.: WO2009/037823
PCT Pub. Date: Mar. 26, 2009

(65) Prior Publication Data
US 2010/0202718 A1   Aug. 12, 2010

(30) Foreign Application Priority Data
Sep. 18, 2007   (JP) ................................. 2007-240740

(51) Int. Cl.
*F16C 41/00* (2006.01)
(52) U.S. Cl.
USPC ........................................................ 384/448
(58) Field of Classification Search
USPC ...................................... 384/448; 73/862.322
See application file for complete search history.

(56) References Cited

U.S. PATENT DOCUMENTS

| 7,604,416 B2 * | 10/2009 | Niebling et al. | 384/544 |
| 7,856,893 B2 * | 12/2010 | Ozaki et al. | 73/862.321 |
| 2002/0012484 A1 | 1/2002 | Salou et al. | |
| 2009/0038414 A1 | 2/2009 | Ozaki et al. | |
| 2009/0097791 A1 * | 4/2009 | Ozaki et al. | 384/448 |
| 2009/0114004 A1 | 5/2009 | Ozaki et al. | |
| 2010/0046871 A1 * | 2/2010 | Norimatsu et al. | 384/448 |

FOREIGN PATENT DOCUMENTS

| JP | 59-23889 | 6/1984 |
| JP | 2002-98138 | 4/2002 |
| JP | 2006-77807 | 3/2006 |
| JP | 2007-239848 | 9/2007 |
| JP | 2008-190707 | 8/2008 |
| WO | 2007/066593 A1 | 6/2007 |

OTHER PUBLICATIONS

Chinese Office Action issued Jun. 16, 2011 in corresponding Chinese Patent 200880107425.5.

(Continued)

*Primary Examiner* — Thomas R Hannon

(57) ABSTRACT

A sensor-equipped wheel support bearing assembly capable of accurately detecting load without affected by hysteresis is provided. The assembly includes a vehicle body fitting flange having bolt holes at respective circumferential portions in the form of projecting pieces. A sensor unit including a strain generating member having contact fixing segments to be fixed to the stationary member and a cutout portion, and a sensor element for detecting strain in a periphery of the cutout portion is provided with the contact fixing segments at positions of the same size in an axial direction relative to the outer diametric surface of the stationary member. The contact fixing segments are spaced each other an angle about an axis of the stationary member, and the angle between the contact fixing segments at respective end portions of the sensor unit is smaller than half the angle between the projecting pieces.

6 Claims, 8 Drawing Sheets

OTHER PUBLICATIONS

Chinese Office Action dated Nov. 30, 2011 issued in corresponding Chinese Patent Application No. 200880107425.5.
U.S. Appl. No. 12/449,451, filed Aug. 7, 2009, Isobe et al., NTN Corporation.
U.S. Appl. No. 12/086,089, filed Jun. 5, 2008, Ozaki et al., NTN Corporation.
U.S. Appl. No. 12/224,802, filed Sep. 5, 2008, Ozaki et al., NTN Corporation.
International Search Report for PCT/JP2008/002538, mailed Oct. 21, 2008.
English Translation of the International Preliminary Report on Patentability mailed Apr. 15, 2010 in corresponding International Patent Application PCT/JP2008/002538.
Japanese Office Action mailed May 15, 2012 issued in corresponding Japanese Patent Application No. 2007-240740.

* cited by examiner

WHEEL BEARING WITH SENSOR

CROSS REFERENCE TO THE RELATED APPLICATION

This application claims the benefit under 35 U.S.C. Section 371, of PCT International Application No. PCT/JP2008/002538, filed Sep. 16, 2008, which claimed priority to Japanese patent application No. 2007-240740, filed Sep. 18, 2007, the entire disclosures of which are herein incorporated by reference.

BACKGROUND OF THE INVENTION

1. Field of the Invention

The present invention relates to a wheel bearing with sensor and, more particularly, to a sensor element equipped wheel support bearing assembly of a kind having a load sensor built therein for detecting a load imposed on a bearing unit for the support of a vehicle wheel.

2. Description of the Related Art

As a technique for detecting a load imposed on each of vehicle wheels of an automotive vehicle, a sensor-equipped wheel support bearing assembly capable of detecting the load by the detection of a strain induced in an outer diametric surface of an outer ring flange of the wheel support bearing assembly has been suggested. (See, for example, the Patent Document 1 listed below.) A wheel support bearing assembly has also been suggested, in which a strain amplifying mechanism in the form of an L-shaped member is fitted over a flange portion and an outer diametric portion of a stationary ring and a strain gauge is attached to a portion of such strain amplifying mechanism. (See, for example, the Patent Document 2 listed below.)

[Patent Document 1] JP Laid-open Patent Publication No. 2002-098138

[Patent Document 2] JP Laid-open Patent Publication No. 2006-077807

SUMMARY OF THE INVENTION

According to the technique disclosed in the Patent Document 1 listed above, a strain generated as a result of deformation of a flange portion of a stationary ring is detected. However, such a problem has been found that since the deformation of the flange portion of the stationary ring is accompanied by a friction (slippage) occurring between a flange surface and a knuckle surface, application of repeated loads results in generation of a hysteresis in an output signal.

By way of example, in the event that the load acting in a certain direction relative to the wheel support bearing assembly becomes large, in an early stage no slippage occur between the stationary ring flange surface and the knuckle surface because the static frictional force is initially higher than the load, but when it exceeds a certain quantity, the slippage occurs therebetween since the load overcomes the static frictional force. When the load is reduced while in that condition, no slippage occur at first due to the static frictional force, but when it attains a certain magnitude, the slippage results in. As a result, if an attempt is made to calculate the load at such a portion where the deformation has occurred, such a hysteresis as shown in FIG. 10 occurs in the output signal.

Also, even in the technique disclosed in the Patent Document 2 listed above, a site at which the strain amplifying mechanism in the form of the L-shaped member is fixed to the flange surface, tends to be affected by a friction (slippage) occurring between the flange surface and the knuckle surface and, therefore, a problem similar to that discussed above is found therein.

Furthermore, where a load Fz acting on the wheel support bearing assembly in the vertical direction is to be detected, the amount of strain is small since the amount of a stationary ring deformation relative to the load Fz is small, and, accordingly, the above described techniques are incapable of detecting the load Fz with a high accuracy because of low detecting sensitivity.

An object of the present invention is to provide a sensor-equipped wheel support bearing assembly capable of accurately detecting the load, imposed on the vehicle wheel, without being affected by influences brought about by the hysteresis.

The sensor-equipped wheel support bearing assembly according to the present invention is a sensor-equipped wheel support bearing assembly including an outer member having an inner periphery formed with a plurality of rolling surfaces, an inner member having an outer periphery formed with rolling surfaces opposed to the rolling surfaces of the outer member, a plurality of rows of rolling elements interposed between those opposed rolling surfaces in the outer member and the inner member, a vehicle body fitting flange provided in an outer periphery of one of the outer member and the inner member that serves as a stationary member, adapted to be connected with a knuckle and having a plurality of bolt holes defined at respective circumferential locations thereof and also having projecting pieces, provided in the circumferential locations at which the bolt holes are defined, protruding radially outwardly from the remaining portion of such flange; and a sensor unit including a strain generating member, having at least two contact fixing segments adapted to be fixed to an outer diametric surface of the stationary member in contact therewith and at least one cutout portion, and a sensor element for detecting a strain induced in a portion of the strain generating member in a periphery of the cutout portion, in which the sensor unit is so arranged that the at least two contact fixing segments occupy respective positions that are of a same size in an axial direction relative to the outer diametric surface of the stationary member; and the respective positions of the at least two contact fixing segments are spaced an angle from each other in a direction about an axis of the stationary member and the angle between the contact fixing segments provided at respective end portions of the sensor unit is chosen to be half an angle between the neighboring projecting pieces of the stationary member.

When a load acts between the tire of the vehicle wheel and the road surface, such load is applied also to the stationary member (for example, the outer member). However, since in the instance now under discussion, a strain generating member including at least two contact fixing segments, adapted to be fixed to the outer diametric surface of the stationary member in contact therewith, and one or more cutout portions and a sensor unit including a sensor element for detecting a strain occurring in the neighborhood of the cutout portion in the strain generating member are so arranged that the at least two contact fixing segments can occupy respective positions of the same size in a direction axially thereof, the at least two contact fixing segments are spaced an angle from each other in a direction about the axis of the stationary member, and the angle between the contact fixing segments provided at respective ends of the sensor unit is chosen to be half the angle between the neighboring projecting pieces of the stationary member, the sensor unit is hardly susceptible to influence brought about by the sliding friction in the projecting pieces. As a result thereof, the hysteresis in the output signal can be reduced.

Also, since in the outer diametric surface of the stationary member referred to above, the amount of deformation varies depending on the position in a direction circumferentially thereof, due to positioning of the at least two contact fixing segments in a fashion spaced from each other in the circumferential direction as hereinabove described, the difference in amount of deformation among those contact fixing segments allows the strain to be generated in a periphery of the cutout portion in the strain generating member, with the amount of such strain consequently detected by the sensor element. Accordingly, regardless of a halted condition or a low speed travel, the working force between the vehicle wheel and the wheel tire can be detected with high sensitivity. As hereinabove discussed, since the sensor unit is not fixed to the projecting piece of the vehicle body fitting flange of the stationary member, which tends to constitute a major cause of the hysteresis, the hysteresis occurring in the output signal from the sensor element can be reduced and the load can be consequently detected accurately. In this way, the load acting on the vehicle wheel can be detected with high sensitivity without being affected by the influences brought about by the hysteresis.

In one embodiment of the present invention, the at least two contact fixing segments may be provided in a periphery of rolling surfaces of the stationary member.

Since a force acting between the wheel tire and the road surface is transmitted to the outer diametric surface of the stationary member through the rolling elements, if the at least two contact fixing segments of the strain generating member in the sensor unit are provided in a periphery of the rolling surface of the stationary member, the sensor unit is therefore installed at a site of the stationary member, where the amount of deformation is relatively large, and, accordingly, the load can be detected further highly accurately.

In one embodiment of the present invention, the angle between the at least two contact fixing segments may be chosen to be half the pitch of arrangement of the rolling elements. In the case of this construction, since the mode of deformation of the sensor unit changes depending on the position of the rolling elements, the output from the sensor element is susceptible to change in dependence on the cycle of movement of the rolling element past a position in a periphery of the sensor unit. As a result, from the amplitude of the output signal that is hardly affected by influences brought about by a temperature drift, the load can be detected.

In one embodiment of the present invention, the sensor unit may not plastically deform even in a condition in which as an external force acting on the stationary member or a working force acting between a tire of a vehicle wheel, fitted to a rotating member, and a road surface, the expected maximum force is applied. If the plastic deformation occurs until a condition in which the expected maximum force is applied, deformation of the stationary member cannot be accurately transmitted to the sensor unit and the strain measurement will be adversely affected. Accordingly, it is preferred that the plastic deformation does not occur even in the condition in which the expected maximum force is applied.

In one embodiment of the present invention, the contact fixing segments may be provided in a portion of the stationary member intermediate between the projecting pieces. In the case of this construction, the contact fixing segments are provided at respective locations spaced from the projecting pieces, which tend to constitute a cause of the hysteresis, and, accordingly, the hysteresis of the output signal from the sensor element is effectively reduced with the load consequently detected with high precision.

In one embodiment of the present invention, the sensor unit may be provided in upper and lower surface portions of the outer diametric surface of the stationary member relative to a surface of placement of a tire of a vehicle wheel fitted to the rotating member. If in the outer diametric surface of the stationary member, the sensor unit is provided at a position, where the load of the rolling elements is applied at all times even when the load Fz acting in a vertical direction or the load Fy acting in a fore and aft direction is applied, that is, a position, which defines the upper and lower surface portions relative to the tire contact surface, the load can be accurately detected in any events.

In one embodiment of the present invention, a calculating section may be provided for calculating a working force, acting on the wheel support bearing assembly, in terms of at least one of the absolute value of an output signal, the average value of an output signal and the amplitude of an output signal.

When the working force between the wheel tire and the road surface is calculated by the calculating section in reference to the output signal from the sensor element, the working force between the wheel tire and the road surface can be detected with high sensitivity regardless of a halted condition or a low speed travel. Not only the working force acting between the wheel tire and the road surface, but also the force acting on the wheel support bearing assembly (such as, for example, the preload amount) can be calculated by the calculating section.

However, it may occur that depending on the presence or absence of the rolling elements moving past an area of the rolling surface in a periphery of the sensor unit during the rotation of the wheel support bearing assembly, the amplitude of an output signal from the sensor element of the sensor unit fluctuates cyclically. In view of this, by measuring the cycle of the peak value, appearing in the detected signal, with the calculating section, the number of revolutions of the vehicle wheel can be detected. Where any change appears in the output signal in the way as discussed above, the load can be calculated by use of the average value or amplitude of the output signal. Where no change appears, the load can be calculated by use of the absolute value.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

A first embodiment of the present invention will now be described in detail with particular reference to FIGS. 1 to 5. This embodiment is directed to an inner ring rotating type wheel support bearing assembly of a third generation model, which is used to rotatably support a vehicle drive wheel. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard".

Figure 1:
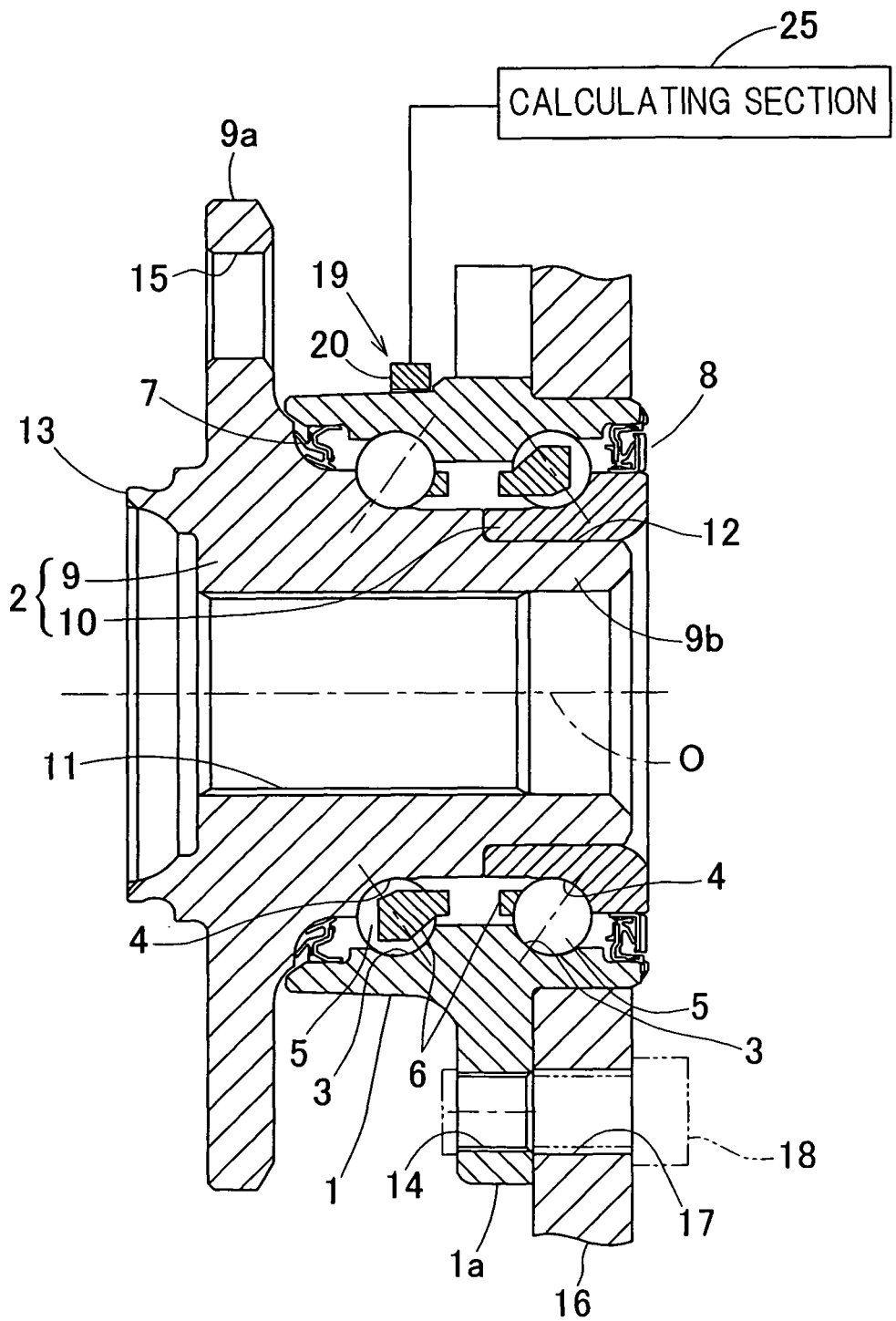
FIG. 1 is a sectional view showing a sensor-equipped wheel support bearing assembly according to a first embodiment of the present invention.

A bearing unit employed in this sensor-equipped wheel support bearing assembly includes, as shown in a sectional representation in FIG. 1, an outer member 1 having an inner periphery formed with a plurality of rolling surfaces 3, an inner member 2 having rolling surfaces 4 defined therein in face-to-face relation with the respective rolling surfaces 3, and a plurality of rows of rolling elements 5 interposed rollingly between the rolling surfaces 3 in the outer member 1 and the rolling surfaces 4 in the inner member 2. This wheel support bearing assembly is rendered to be of a double row angular contact ball bearing type, in which the rolling elements 5 are employed in the form of balls and are retained by a retainer 6 employed for each of the rows. The rolling surfaces 3 and 4 have a sectional shape representing an arcuate shape and are so formed as to permit the ball contact angles to lie in back-to-back relation with each other. Opposite ends of a bearing space delimited between the outer member 1 and the inner member 2 are sealed by a pair of sealing members 7 and 8.

The outer member 1 serves as a stationary member and is of one piece construction including a vehicle body fitting flange 1a defined in an outer periphery thereof and adapted to be secured to a knuckle 16 of a suspension system (not shown) of an automotive vehicle. The flange 1a has a plurality of vehicle body fitting bolt holes 14 defined at respective circumferential locations and, the vehicle body fitting flange 1a may be secured to the knuckle 16 when knuckle bolts 18 inserted from an inboard side into respective bolt insertion holes 17 defined in the knuckle 16 are threaded into the corresponding bolt holes 14.

The inner member 2 serves as a rotating member and includes a hub unit 9, having a wheel mounting hub flange 9a formed therein, and an inner ring 10 mounted on an outer periphery of an inboard end of a hub axle 9b of the hub unit 9. The rolling surfaces 4 referred to above are formed respectively in the hub axle 9 and in the inner ring 10. An outer periphery of an inboard end of the hub unit 9 is provided with an inner ring mounting surface 12 that is stepped radially inwardly to render it to have a reduced diameter, with the inner ring 10 mounted on this inner ring mounting surface 12. The hub unit 9 has a center portion formed with a center bore 11 extending completely therethrough. The hub flange 9a is provided with a plurality of press fitting holes 15 defined at respective locations spaced in a direction circumferentially thereof, for receiving corresponding hub bolts (not shown). In a periphery of a root portion of the hub flange 9a of the hub unit 9, a cylindrical pilot portion 13 for guiding a vehicle wheel and a brake component protrudes towards the outboard side.

Figure 2:
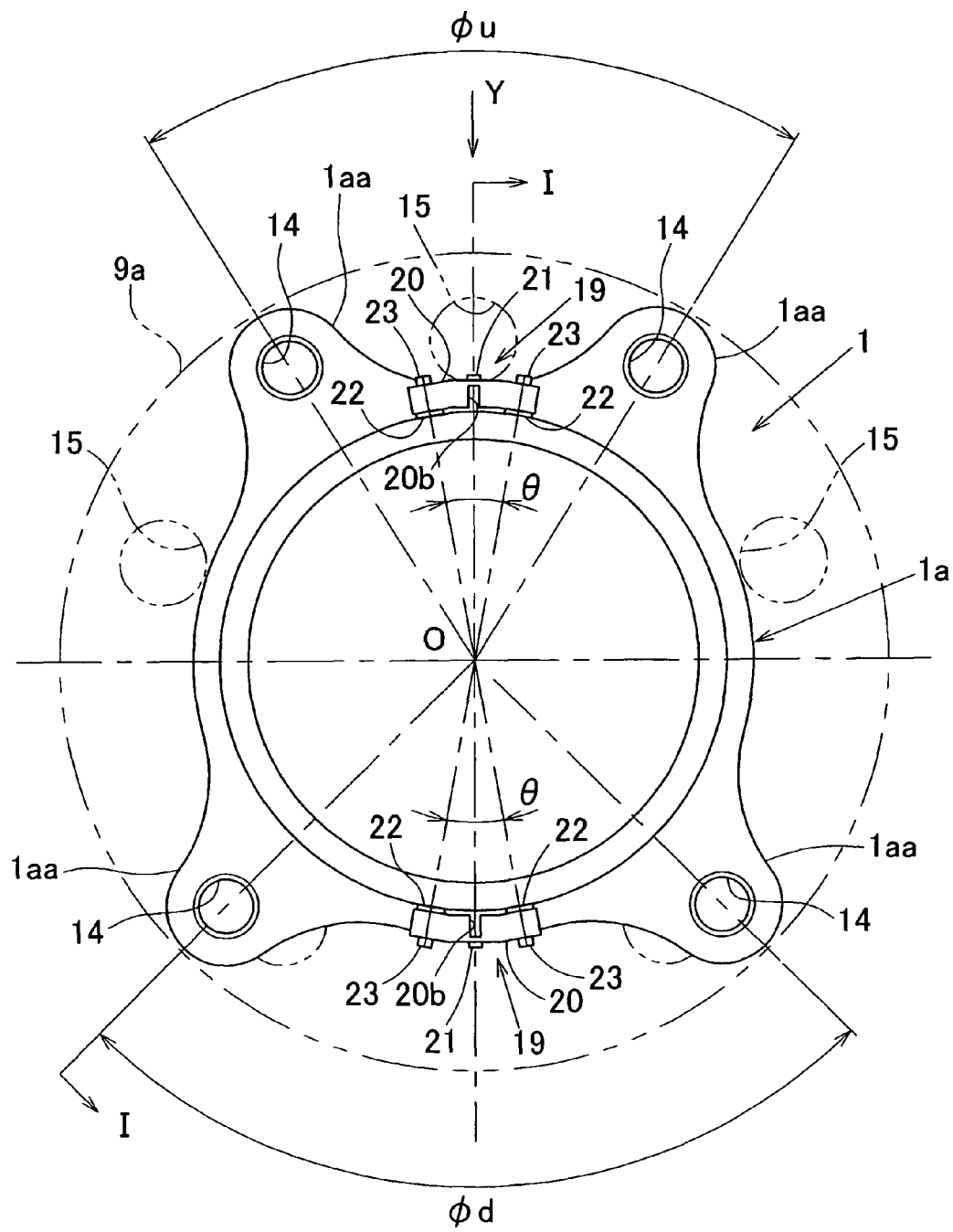
FIG. 2 is a front elevational view showing an outer member employed in the sensor-equipped wheel support bearing assembly.

FIG. 2 illustrates a front elevational view showing the outer member 1 of the wheel support bearing assembly as viewed from the outboard side. It is to be noted that FIG. 1 illustrates a cross sectional view taken along the arrow headed line I-I in FIG. 2. The vehicle body fitting flange 1a referred to previously has, as best shown in FIG. 2, projecting pieces 1aa, which are provided in respective circumferential locations in which the corresponding bolt holes 14 are formed, protruding in a direction radially outwardly beyond the remaining area.

The outer member 1 serving as the stationary member has an outer diametric surface provided with a sensor unit 19. In the instance as shown, the sensor unit 19 is provided at each of two locations in the outer diametric surface of the outer member, that is, on upper and lower surface portions of the outer diametric surface of the outer member 1, which are positioned one above the other in a vertical direction perpendicular to a tire tread so that a load Fz acting on the wheel support bearing assembly in the vertical direction may be detected. More specifically, as best shown in FIG. 2, one of the sensor units 19 is arranged on an area of the upper surface portion of the outer diametric surface of the outer member 1, which lies intermediate between two neighboring projecting pieces 1aa, whereas the other of the sensor units 19 is arranged on an area of the lower surface portion of the outer diametric surface of the outer member 1, which similarly lies intermediate between two neighboring projecting pieces 1aa.

Figure 3:
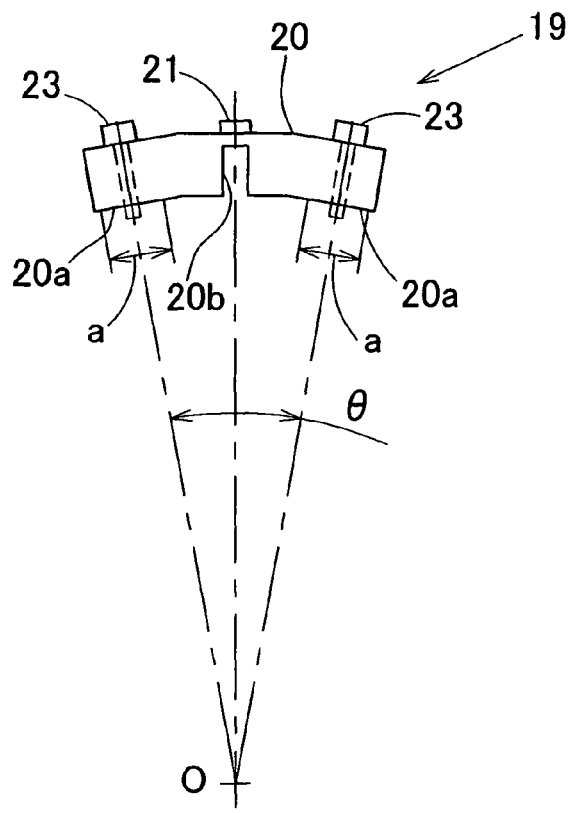
FIG. 3 is a front elevational view showing, on an enlarged scale, a sensor unit employed in the sensor-equipped wheel support bearing assembly.

As best shown on an enlarged scale in a sectional representation in FIG. 3, each of the sensor units 19 includes a strain generating member 20 and a sensor element 21 fitted to the strain generating member 20 for detecting a strain induced in the strain generating member 20. The strain generating member 20 is of a generally arcuate shape and made of a metallic material such as, for example, a steel material and includes at least two contact fixing segments 20a, adapted to be fixed to an outer diametric surface of the outer member 1 in contact therewith, and at least one cutout portions 20b. In the instance now under discussion, the strain generating member 20 has two contact fixing segments 20a, positioned on respective end portions thereof, and one cutout portion 20b positioned intermediate between and intervening between the two contact fixing segments 20a. It is to be noted that reference character "a" employed in each of the figures represents the width of each of the contact fixing segments 20a. The cutout portion 20b referred to previously is rendered to be of a shape formed by cutting from an inner surface side of the strain generating member 20 towards an outer surface side thereof. The sensor element 21 is attached to an area of the strain generating member 20, where a large strain occurs relative to a load acting in various directions. In the instance as shown, for that area, an area of the strain generating member 20 in a periphery of the cutout portion 20*b*, more specifically an area on the outer surface side of the strain generating member 20 and on a rear side of the cutout portion 20*b* is selected so that the sensor element 21 may detect the strain occurring in a periphery of the cutout portion 20*b*. It is to be noted that the strain generating member 20 may be of a type which will not undergo any plastic deformation even when the expected maximum force is applied as an external force acting on the outer member 1 which is the stationary member, or the working force acting between the tire and the road surface. The expected maximum force referred to above is the maximum force which will not result in such a damage which will otherwise hamper the normal operation of the wheel support bearing assembly as a bearing assembly. Once such a plastic deformation occurs, the deformation of the outer member 1 will not be transmitted accurately to the sensor unit 19 and, therefore, measurement of the strain will be adversely affected.

The sensor unit 19 referred to previously is of such a design, in which the two contact fixing segments 20*a* of the strain generating member 20 employed therein are arranged on the outer diametric surface of the outer member 1 so as to occupy respective positions of the same size in the axial direction and those contact fixing segments 20*a* so positioned are fixed to the outer diametric surface of the outer member 1 through respective spacers 22 by means of associated bolts 23. More specifically, those two contact fixing segments 20*a* are fixed to respective positions of the outer diametric surface of the outer member 1 in a periphery of the rolling surface 3 for an outboard side row. It is to be noted that the proximity to the rolling surface 3 for the outboard side row referred to above intended to mean a region ranging from a position intermediate between the rolling surfaces 3 for an inboard side row and the outboard side row, respectively, to a site where the rolling surface 3 for the outboard side row.

As described above, fixing of the contact fixing segments 20*a* to the outer diametric surface of the outer member 1 through the associated spacers 22 in the manner described above allows the site intermediate between the two contact fixing segments 20*a*, where the cutout portion 20*b* is located in the strain generating member 20, to be separated from the outer diametric surface of the outer member 1 and, hence, a strain induced deformation can be facilitated in a region in a periphery of the cutout portion 20*b*.

Figure 4:
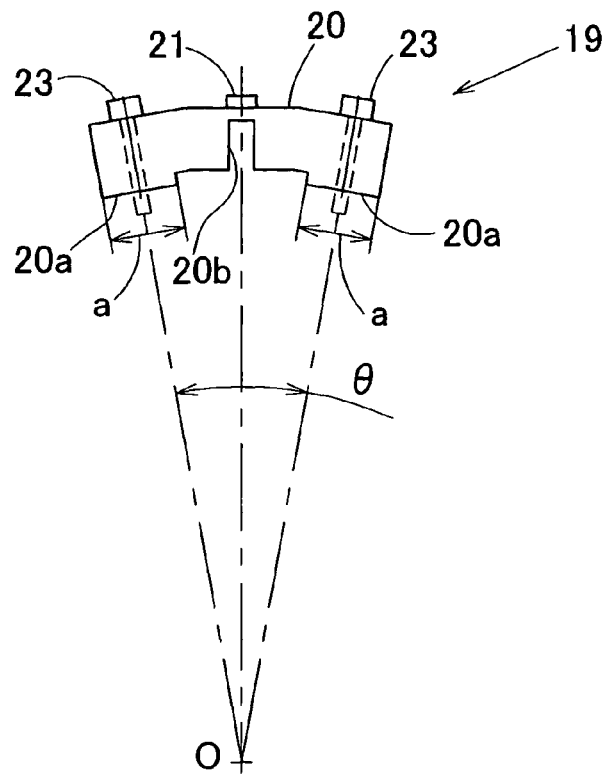
FIG. 4 is a front elevational view showing, on an enlarged scale, a different construction of the sensor unit.

Other than the fixing of the contact fixing segments 20*a* of the strain generating member 20 to the outer diametric surface of the outer member 1 through the associated spacers 22 as hereinabove described, the contact fixing segments 20*a* may be so shaped to protrude in a direction towards the inner surface of the strain generating member 20 as best shown in FIG. 4 and, incidentally, the use of the spacers 22 can be dispensed with. Even in this case, the site intermediate between the two contact fixing segments 20*a*, where the cutout portion 20*b* in the strain generating member 20 is positioned, is separated from the outer diametric surface of the outer member 1 and, hence, a strain induced deformation can in a periphery of the cutout portion 20*b* can be facilitated.

Other than that, a groove may be provided at a site intermediate between two locations of the outer diametric surface of the outer member 1, to which the respective contact fixing segments 20*a* of the strain generating member 20 are fixed, so that the site intermediate between the two contact fixing segments 20*a*, where the cutout portion 20*b* in the strain generating member 20 is positioned, may be separated from the outer diametric surface of the outer member 1.

It is to be noted that for stably fixing the sensor unit 19 to the outer diametric surface of the outer member 1, a flat area may be formed at respective locations on the outer diametric surface of the outer member 1, to which the contact fixing segments 20*a* of the strain generating member 20 are fixed in contact therewith.

Also, the two contact fixing segments 20*a* are installed so as to have a spacing angle θ about the axis of the outer member 1. By way of example, in the sensor unit 19 arranged in the upper surface portion of the outer diametric surface of the outer member 1, the spacing angle θ referred to above is so chosen as to be equal to or smaller than half the angle φu (θ<(½)φu) between the two projecting pieces 1*aa* in the outer member 1, which are positioned at a location intervening therebetween the sensor unit 19. Similarly, in the sensor unit 19 arranged in the lower surface portion of the outer diametric surface of the outer member 1, the spacing angle θ referred to above is so chosen as to be equal to or smaller than half the angle φd (θ<(½)φd) between the two projecting pieces 1*aa* in the outer member 1, which are positioned at a location intervening therebetween this sensor unit 19.

The sensor element 21 of the sensor unit 19 is connected with a calculating section 25. This calculating section 25 calculates a working force acting between a tire of the vehicle wheel and a road surface in reference to an output signal from the sensor element 21 and includes, for example, a signal processing circuit and a correcting circuit. The calculating section 25 also includes a relation setting element (not shown), in which a relation between the working force between the tire of the vehicle wheel and the road surface and an output signal of the sensor element 21 is set in terms of an arithmetic expression or a table or the like and makes use of the relation setting element to output the working force from the output signal which has been inputted. Contents to be set in the relation setting element are determined by a series of preparatory tests and/or simulations and are then set therein.

When a load acts between the tire of the vehicle wheel and the road surface, such load is applied also to the outer member 1, which is the stationary member of the wheel support bearing assembly, and deformation occurs therein accordingly. If the sensor unit 19 is installed on, for example, the projecting piece 1*aa* of the vehicle body fitting flange 1*a* so that the load can be calculated from the deformation of the vehicle body fitting flange 1*a*, hysteresis occurs in the output signal as discussed in connection with the related art.

In the instance now under discussion, the sensor unit 19 including the strain generating member 20, having the two contact fixing segment 20*a* fixed to the outer diametric surface of the outer member 1 in contact therewith and the one cutout portion 20*b*, and the sensor element 21 for detecting the strain occurring in a periphery of the cutout portion 20*b* in the strain generating member 20 are so arranged that the two contact fixing segments 20*a* may occupy respective positions of the same size in a direction axially thereof relative to the outer diametric surface of the outer member, with the two contact fixing segments 20*a* spaced an angle θ from each other about the longitudinal axis of the outer member 1, which angle θ is equal to or smaller than half the angle φu (or φd) between the neighboring projecting pieces 1*aa* of the outer member 1, and, accordingly, the sensor unit 19 can be hardly susceptible to the influences brought about by a sliding friction in those projecting pieces 1*aa*. As a result, the hysteresis in the output signal can be reduced.

Also, since in the outer diametric surface of the outer member 1, the amount of deformation varies depending on the position in the axial direction thereof, due to positioning of the at least two contact fixing segments in a fashion spaced from each other in the circumferential direction as hereinabove described, the difference in amount of deformation between those contact fixing segments 20a allows the strain to occur in a periphery of the cutout portion 20b in the strain generating member 20, with the amount of such strain consequently detected by the sensor element 21. The calculating section 25 referred to previously calculates the load, acting on the wheel support bearing assembly, in reference to the output signal from the sensor element 21. Accordingly, regardless of a halted condition or a low speed travel, the working force between the vehicle wheel and the wheel tire can be detected with high sensitivity. As hereinabove discussed, since the sensor unit 19 is not fixed to the projecting piece of the vehicle body fitting flange 1a of the stationary member, which tends to constitute a major cause of the hysteresis, the hysteresis occurring in the output signal from the sensor element 21 can be reduced and the load can be consequently detected accurately.

Although in describing the foregoing embodiment of the present invention, reference has been made to the detection of the working force acting between the wheel tire and the road surface, it may be designed to detect not only the working force acting between the wheel tire and the road surface, but also a force acting on the wheel support bearing assembly (such as, for example, a preload amount).

When the detected load obtained from this sensor-equipped wheel support bearing assembly is used in controlling the automotive vehicle, it can contribute to a stabilized travel of the automotive vehicle. Also, when this sensor-equipped wheel support bearing assembly is used, the load sensor can be installed compactly in the automotive vehicle and an excellent mass-production can be afforded, along with reduction in cost.

Figure 5:
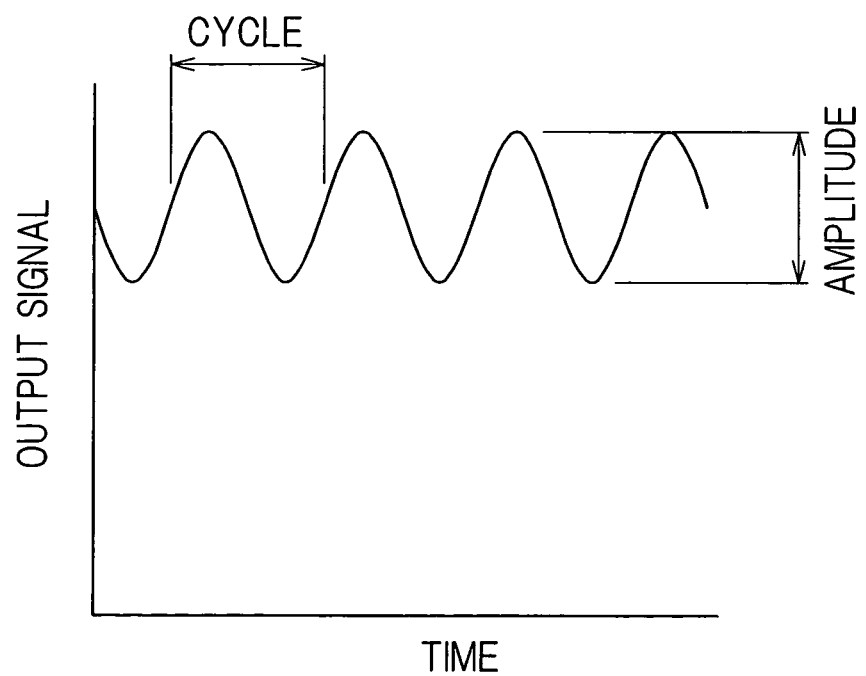
FIG. 5 is a diagram showing a waveform of an output signal from a sensor element employed in the sensor-equipped wheel support bearing assembly.

Also, it may occur that depending on the presence or absence of the rolling elements 5 moving past an area of the rolling surface 3 in a periphery of the sensor unit 19 during the rotation of the wheel support bearing assembly, the amplitude of an output signal from the sensor element 21 of the sensor unit 19 changes cyclically as shown by the waveform in FIG. 5. The reason therefor is that the amount of deformation exhibited when the rolling elements 5 move past that area of the rolling surface 3 and that exhibited when the rolling elements 5 have not yet moved past that area of the rolling surface 3 are different from each other and, hence, the amplitude of the output signal from the sensor element 21 has a peak value for each cycle of movement of the rolling elements 5 past that area. In view of this, by measuring the cycle of the peak value, appearing in the detected signal, with, for example, the calculating section 25, the speed of movement of the rolling element 5, that is, the number of revolutions of the vehicle wheel can be detected. Where any change appears in the output signal in the way as discussed above, the load can be calculated by use of an average value or amplitude of the output signal. Where no change appears, the load can be calculated by use of the absolute value.

The force having acted between the wheel tire and the road surface is transmitted to the outer diametric surface of the outer member 1 through the rolling elements 5, and in the foregoing embodiment, the two contact fixing segments 20a of the strain generating member 20 are provided in a portion of the outer diametric surface of the outer member 1 in a periphery of the rolling surface 3 for the outboard side row and it therefore means that the sensor unit 19 is installed at a site of the outer member 1, where the amount of deformation is relatively large, and the load can be further accurately calculated accordingly.

Also, in the foregoing embodiment, the contact fixing segments 20a of the strain generating member 20 in the sensor unit 19 is arranged on the outer diametric surface of the outer member 1 at a location intermediate between the neighboring two projecting pieces 1aa of the flange 1a and, hence, the strain generating member 20 is positioned at a location spaced from the projecting pieces 1aa in a direction circumferentially thereof, where it may constitute a cause of the hysteresis. As a result, the hysteresis occurring in the output signal from the sensor element 21 can be further reduced and the load can therefore be calculated with further high accuracy.

Yet, since in the embodiment hereinbefore described, the sensor unit 19 is provided in the outer diametric surface of the outer member 1 at a location, where the amount of deformation is large even when a load Fz acting in a vertical direction or a load Fy acting in a fore and aft direction is applied, that is, at a location which defines upper and lower surface portions relative to the tire contact surface, the load can be accurately calculated at any occasion. Also, since the sensor unit 19 is of a type capable of detecting a slight strain in the form as amplified, even the load Fz acting in the vertical direction, which is liable to render the amount of deformation of the outer member 1 to be small, can be detected with high sensitivity.

It is to be noted that in the embodiment hereinabove fully described, the following elements are not specifically limited.

The number of sensor units 19 employed, the place where the sensor 19 is installed, the number of the contact fixing segments 20a, the number of sensor elements 21 employed, and the number of cutout portions 20b.

The shape of the sensor unit 19 and the manner of fixing the sensor unit 19 (e.g., bonding or welding)

Figure 6:
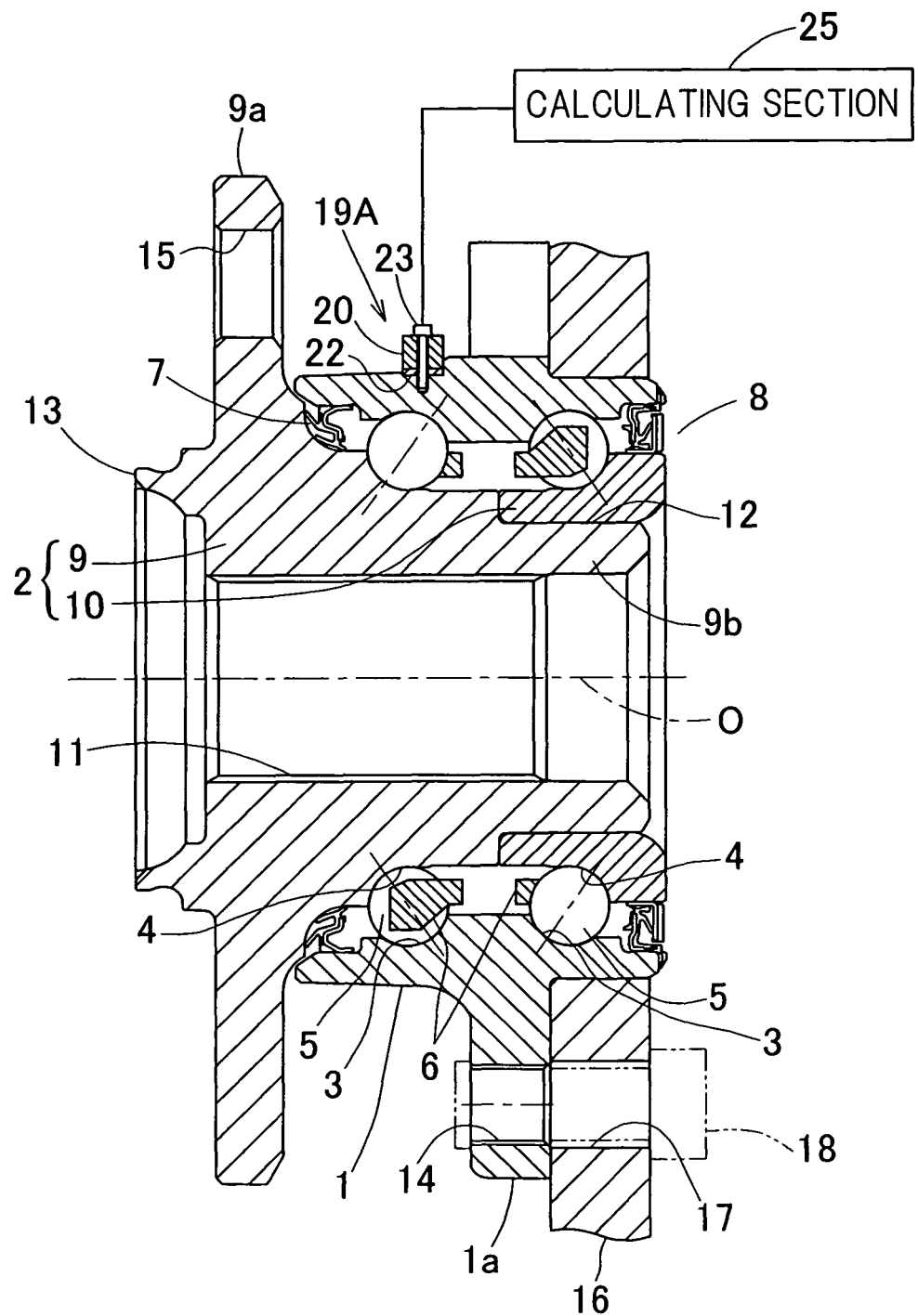
FIG. 6 is a sectional view showing the sensor-equipped wheel support bearing assembly according to a second embodiment of the present invention.
Figure 7:
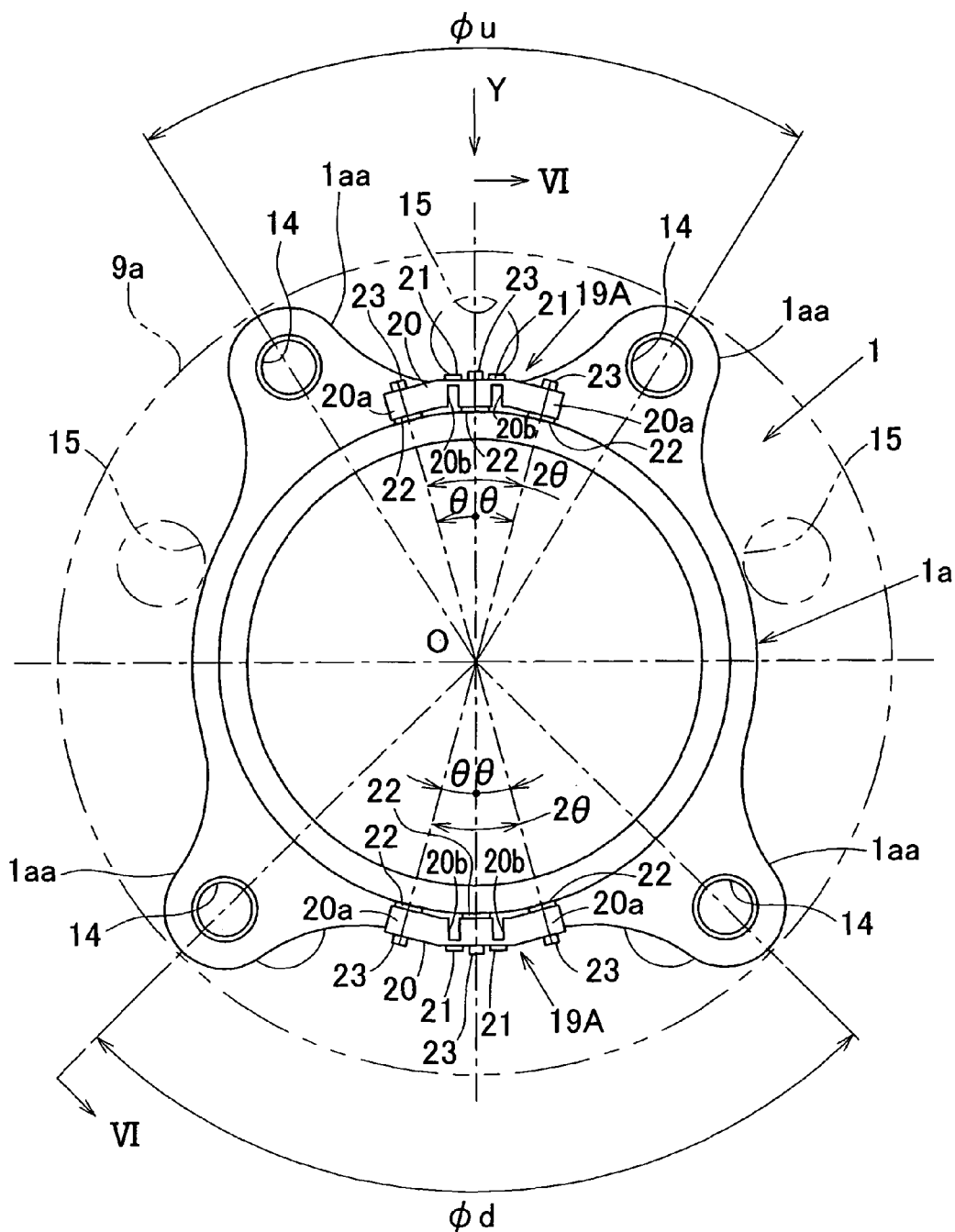
FIG. 7 is a front elevational view showing the outer member employed in the sensor-equipped wheel support bearing assembly.
Figure 8:
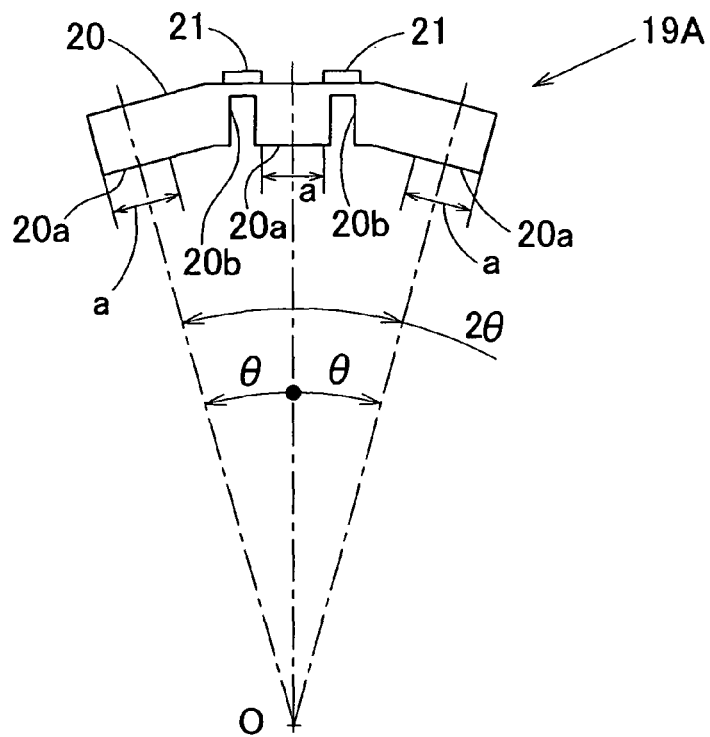
FIG. 8 is a front elevational view showing, on an enlarged scale, the sensor unit employed in the sensor-equipped wheel support bearing assembly.

FIGS. 6 to 8 illustrate a second embodiment. It is to be noted that FIG. 7 illustrates a front elevational view of the outer member 1 of the wheel support bearing assembly as viewed from the outboard side and FIG. 6 illustrates a cross-sectional view taken along the line VI-VI in FIG. 7. This second embodiment is similar to the first described embodiment, but differs therefrom in that the sensor unit 19, employed in the sensor-equipped wheel support bearing assembly according to the first embodiment shown in and described with particular reference to FIGS. 1 to 5, is replaced with a sensor unit 19A of a design shown in a front elevational view in FIG. 8 on an enlarged scale. The sensor unit 19A includes a strain generating member 20, made up of three contact fixing segments 20a and two cutout portions 20b, and two sensor elements 21. More specifically, opposite end portions and a portion intermediate therebetween of the strain generating member 20 are formed with respective contact fixing segments 20a and those contact fixing segments 20a are fixed to the outer diametric surface of the outer member 1 through respective spacers 22 by means of associated bolts 23. Arrangement of those contact fixing segments at respective positions of the same size in the axial direction is similar to that shown and described in connection with the first embodiment. The three contact fixing segments 20a are spaced an angle θ from each other about the longitudinal axis of the outer member 1, and the angle 2θ between the contact fixing segments 20a that are provided at the opposite end portions of the sensor unit 19A is so chosen as to be equal to or smaller than half the angle φu (or φd) between the neighboring projecting pieces 1aa of the outer member 1. The calculating section 25 calculates the load from output signals of those two sensor elements 21 of the sensor unit 19A. Other structural features than those described above are similar to those shown and described in connection with the first embodiment of the present invention.

Figure 9:
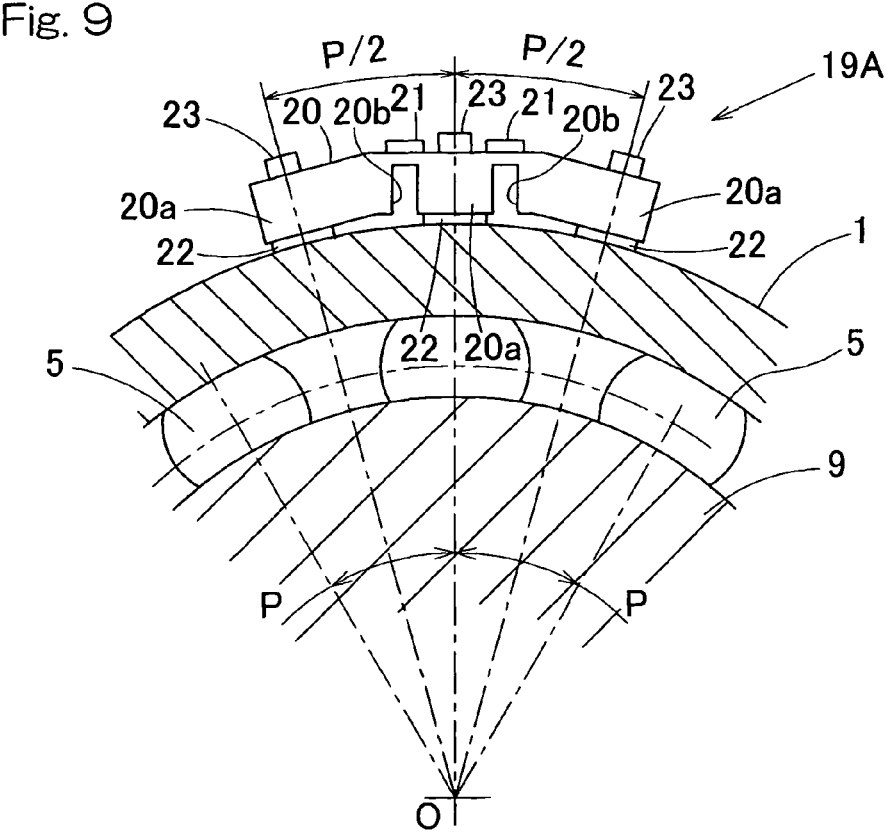
FIG. 9 is a fragmentary sectional view showing, on an enlarged scale, an important portion of the sensor-equipped wheel support bearing assembly according to a third embodiment of the present invention.
Figure 10:
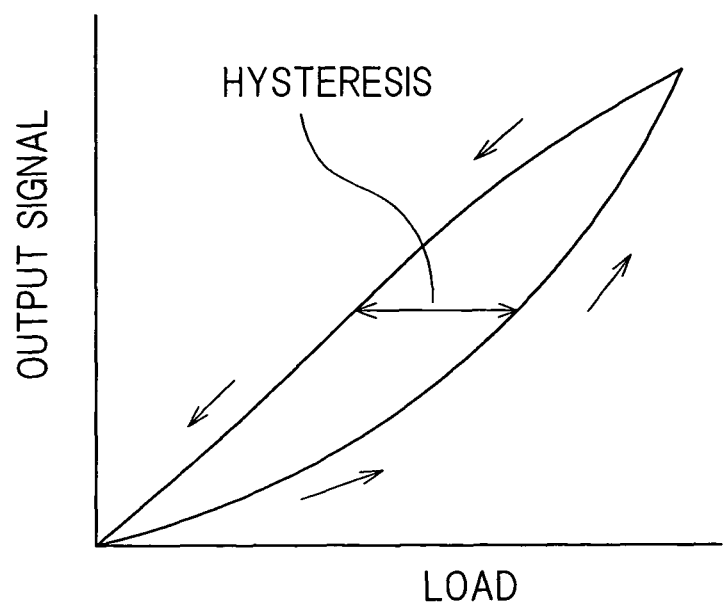
FIG. 10 is an explanatory diagram showing the hysteresis occurring in the output signal in the related art.

FIG. 9 illustrates a third embodiment. In this third embodiment, the three contact fixing segments 20a of the sensor unit 19A employed in the sensor-equipped wheel support bearing assembly shown in and described with particular reference to FIGS. 6 to 8 in connection with the second embodiment of the present invention are so designed that the spacing angle θ of those contact fixing segments 20a about the longitudinal axis of the outer member 1 may be half the pitch P between the neighboring rolling elements 5. Other structural features than those described above are similar to those shown in and described with reference to FIGS. 6 to 8 in connection with the second embodiment.

Where the contact fixing segments 20a are arranged in the manner as hereinabove described, the mode of deformation of the sensor unit 19A changes depending on the position of the rolling elements 5 and, therefore, as shown in FIG. 5, the output signal from the sensor elements 21 is susceptible to change each time the rolling elements 5 move past a position in a periphery of the sensor unit 19A. As a result, from the amplitude of the output signal, which is hardly affected by a temperature drift, the load can be calculated.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A sensor-equipped wheel support bearing assembly comprising:
   an outer member having an inner periphery formed with a plurality of rolling surfaces,
   an inner member having an outer periphery formed with rolling surfaces opposed to the rolling surfaces of the outer member,
   a plurality of rows of rolling elements interposed between those opposed rolling surfaces in the outer member and the inner member,
   a vehicle body fitting flange provided in an outer periphery of one of the outer member and the inner member that serves as a stationary member, adapted to be connected with a knuckle and having a plurality of bolt holes defined at respective circumferential locations thereof and also having projecting pieces, provided in the circumferential locations at which the bolt holes are defined, protruding radially outwardly from the remaining portion of such flange; and
   a sensor unit including a strain generating member, having at least two contact fixing segments adapted to be fixed to an outer diametric surface of the stationary member in contact therewith and at least one cutout portion, and a sensor element for detecting a strain induced in a portion of the strain generating member in a periphery of the cutout portion,
   wherein the sensor unit is so arranged that the at least two contact fixing segments occupy respective positions that are of a same size in an axial direction relative to the outer diametric surface of the stationary member; and the respective positions of the at least two contact fixing segments are spaced an angle from each other in a direction about an axis of the stationary member and the angle between the contact fixing segments provided at respective end portions of the sensor unit is chosen to be half an angle between the neighboring projecting pieces of the stationary member, and
   wherein the angle between the at least two contact fixing segments is chosen to be half a pitch of arrangement of the rolling elements.

2. The sensor-equipped wheel support bearing assembly as claimed in claim 1, wherein the at least two contact fixing segments are provided in a periphery of the rolling surface of the stationary member.

3. The sensor-equipped wheel support bearing assembly as claimed in claim 1, wherein the sensor unit does not plastically deform under a condition in which an expected maximum force, in the form of an external force acting on the stationary member or a working force acting between a tire of a vehicle wheel fitted to a rotating member, and a road surface, is applied.

4. The sensor-equipped wheel support bearing assembly as claimed in claim 1, wherein the contact fixing segments are provided in a portion of the stationary member intermediate between the projecting pieces.

5. The sensor-equipped wheel support bearing assembly as claimed in claim 1, wherein the sensor unit is provided in upper and lower surface portions of the outer diametric surface of the stationary member relative to a tread of a tire of a vehicle wheel fitted to a rotating member.

6. The sensor-equipped wheel support bearing assembly as claimed in claim 1, further comprising a calculating section for calculating an acting force, acting on the wheel support bearing assembly, by use of at least one of an absolute value of an output signal, an average value of the output signal and an amplitude of the output signal.

* * * * *